(12) United States Patent
Dunlop et al.

(10) Patent No.: US 8,016,180 B2
(45) Date of Patent: Sep. 13, 2011

(54) THERMODE CLEANING METHOD

(75) Inventors: Joel Anthony Patrick Dunlop, Cambridge (CA); Ali Abu-El-Magd, Burlington (CA); Ka Ming (Timber) Yuen, Ancaster (CA); Allison Wilson, Cambridge (CA); Anthony Spithoff, Burlington (CA); Walter Strobl, Ayr (CA); Arno Krause, Waterloo (CA)

(73) Assignee: ATS Automation Tooling Systems Inc., Cambridge, Ontario (CA)

( * ) Notice: Subject to any disclaimer, the term of this patent is extended or adjusted under 35 U.S.C. 154(b) by 0 days.

(21) Appl. No.: 12/954,781

(22) Filed: Nov. 26, 2010

(65) Prior Publication Data

US 2011/0127316 A1    Jun. 2, 2011

Related U.S. Application Data

(60) Provisional application No. 61/264,690, filed on Nov. 26, 2009.

(51) Int. Cl.
   *B23K 31/02* (2006.01)
(52) U.S. Cl. .............. 228/178; 228/201; 228/234.1
(58) Field of Classification Search ............. None
   See application file for complete search history.

(56) References Cited

U.S. PATENT DOCUMENTS

| | | | |
|---|---|---|---|
| 3,406,044 A * | 10/1968 | Harris | 428/408 |
| RE26,885 E * | 5/1970 | Harris | 428/408 |
| 3,821,513 A * | 6/1974 | Christensen | 219/233 |
| 4,795,077 A | 1/1989 | Geyer et al. | |
| 5,639,356 A * | 6/1997 | Levine | 204/164 |
| 5,652,428 A * | 7/1997 | Nishioka et al. | 850/4 |
| 5,816,480 A * | 10/1998 | Nakamura et al. | 228/201 |
| 5,934,542 A * | 8/1999 | Nakamura et al. | 228/44.7 |
| 6,082,379 A * | 7/2000 | Kent et al. | 134/21 |
| 6,365,232 B1 * | 4/2002 | Allen | 427/318 |
| 6,573,702 B2 * | 6/2003 | Marcuse et al. | 324/756.03 |
| 6,592,017 B2 | 7/2003 | Morris et al. | |
| 6,875,966 B1 * | 4/2005 | Barber et al. | 219/616 |
| 6,887,319 B2 | 5/2005 | Suga et al. | |
| 6,890,430 B2 | 5/2005 | Mawatari | |
| 6,948,650 B2 | 9/2005 | Howell et al. | |
| 7,303,636 B1 * | 12/2007 | Koba et al. | 134/1 |
| 7,866,530 B1 * | 1/2011 | Riachentsev | 228/51 |

(Continued)

FOREIGN PATENT DOCUMENTS

DE    4326970 A1    2/1995

(Continued)

OTHER PUBLICATIONS

Flux Collection and Self-Clean Technique in Reflow Applications, Jon Dautenhahn and Dr. Rita Mohanty, Date of Publication: Unknown, http://speedlinetech.com/docs/papers/electrovert/FluxCollectionSelfClean.pdf.

(Continued)

*Primary Examiner* — Kiley Stoner
(74) *Attorney, Agent, or Firm* — Neil Henderson

(57) ABSTRACT

A method for cleaning a thermode tip including applying an energy pulse to the thermode tip. The energy pulse involves raising the temperature of the thermode tip higher than the working temperature of the thermode tip. A method for cleaning a thermode tip may include periodically performing a predetermined number of soldering cycles at a working temperature; and applying an energy pulse to the thermode tip.

15 Claims, 7 Drawing Sheets

U.S. PATENT DOCUMENTS

| | | | |
|---|---|---|---|
| 7,870,990 B2 * | 1/2011 | Dhanjal | 228/51 |
| 2003/0221702 A1 * | 12/2003 | Peebles | 134/1 |
| 2005/0218567 A1 | 10/2005 | Goffette | |
| 2006/0192116 A1 * | 8/2006 | Baur et al. | 250/310 |
| 2009/0130622 A1 * | 5/2009 | Bollinger et al. | 433/29 |
| 2009/0321500 A1 * | 12/2009 | Okada et al. | 228/119 |
| 2010/0038560 A1 * | 2/2010 | Tokura et al. | 250/492.1 |

FOREIGN PATENT DOCUMENTS

| | | | |
|---|---|---|---|
| GB | 1015692 A | | 1/1966 |
| JP | 04-111329 A | * | 4/1992 |
| JP | 05-190589 A | * | 7/1993 |

OTHER PUBLICATIONS

English Abstract of DE Application No. DE19934326970, Publication No. DE4326970, Feb. 16, 1995, European Patent Office Website (espacenet.com/publiationdetails).

PCT International Searching Authority (CA), International Search Report, Feb. 10, 2011, PCT/CA2010/001892.

PCT International Searching Authority (CA), The Written Opinion of the International Searching Authority, Feb. 10, 2011, PCT/CA2010/001892.

* cited by examiner

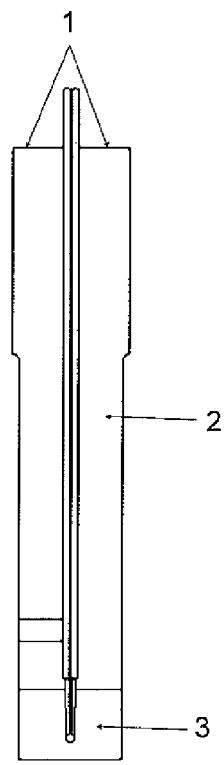
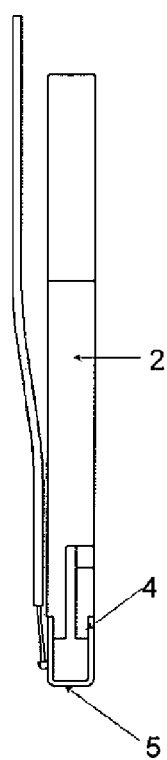
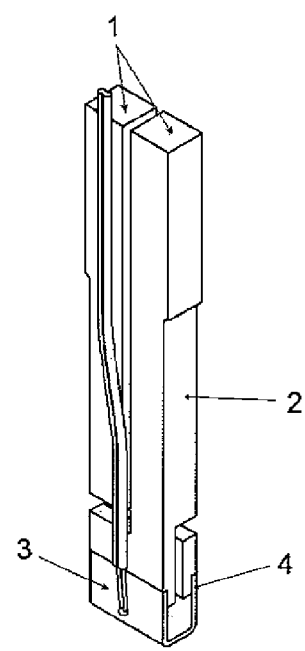
Fig. 1C (Prior Art)
Fig. 1A (Prior Art)
Fig. 1B (Prior Art)

THERMODE CLEANING METHOD

RELATED APPLICATIONS

This patent claims priority to U.S. Provisional Patent Application 61/264,690 filed Nov. 26, 2009, which is hereby incorporated by reference.

FIELD

The present document relates generally to thermode cleaning. More particularly, the present document relates to a cleaning method for cleaning thermode soldering tips.

BACKGROUND

Thermodes are devices used for local application of heat and pressure, typically in soldering applications known as 'Hot-bar reflow soldering'. Once the thermode is brought into contact with a desired location, localized heating is produced by direct resistance heating of the tip of the thermode. The 'soldering gun' is a common example.

The main advantage of thermode soldering is the very rapid temperature change (up to 1000° Celsius per second) with precise control over the temperature while the component parts are being mechanically held by thermode contact pressure. Also, since the hottest portion of the thermode is typically in direct contact with the part bond area, efficient heat transfer occurs and rapid heating of the item is possible. The bond area is the area(s) of the part being processed where a reflow soldered bond is desired between at least two surfaces. Since the tips have little thermal mass, rapid cooling and solidification of the completed bond is possible. Forced air cooling can additionally be used to reduce the time required for the soldering cycle.

There are several styles of thermodes in common use, which differ mainly by the shape of the tip and material used. A thermode typically includes the following elements:
- Terminals: electrical contacts where power is applied.
- Mount: means of mechanically supporting the thermode (possibly the same structure as supports the terminals).
- Shank: means of supporting the tip and conducting current to it.
- Tip: high resistance section where the majority of heat is developed.
- Transition zone: means of joining the tip to the shank.
- Working surface: the portion of the tip, which comes in contact with the item to be heated.
- Thermocouple: a device for determining the working temperature, attached to the tip near the working surface Issues may arise when the thermode, especially the thermode tip, requires cleaning due to a build-up of flux/solder residue and gradual metallurgical contamination of the working surface (collectively referred to as residue or debris). Even with the no-clean flux formulations, which may contain less than 5% solids, there is still residue build-up over time as the actual burn-off amount for no-clean fluxes is generally about 50% of the initial flux weight. Cleaning off the residue may require hours of downtime of the manufacturing system and reduced service life, which can cost a company many thousands of dollars of lost revenue over a year. Current methods may require the thermode soldering tips to be abrasively scrubbed or chemically cleaned every 150 to 175 soldering cycles.

Currently, various thermode tip cleaning methods are employed; although not without their disadvantages. Another common method for thermode tip cleaning is the use of a sponge soaked in water or a chemical cleaning solution. An air blast may also be used to clean the thermode tip. Both the air blast method and wet sponge method generally do not eliminate the need for mechanical scrubbing of the thermode, but may somewhat reduce the frequency of the mechanical scrubbing. Each of these methods typically requires additional tooling at the soldering site. Thus, there is a need for a method of cleaning a thermode that overcomes at least some of the deficiencies of conventional systems and methods.

SUMMARY

This application relates to a method of cleaning a thermode that is intended to take less time to complete, require minimal additional tooling or motion and improve the useful life of the thermode. This cleaning method is also intended not to reduce the soldering process reliability or generate additional particulates that may contaminate the local environment.

In one aspect, there is provided a method for cleaning thermode tips including the application of an energy pulse to the thermode tip while the thermode tip is not in contact with a bond, such that the thermode tip reaches a predetermined temperature above a working temperature of the tip. This method may result in a longer interval between normal mechanical scrubbing cycles and a substantial increase in thermode life.

In another aspect, described herein, a method for cleaning a thermode tip is provided, including, periodically: performing a predetermined number of soldering cycles at a working temperature; and applying an energy pulse to the thermode tip while the thermode tip is not in contract with a bond, such that the thermode tip reaches a predetermined temperature above a working temperature of the tip.

In the above methods, the energy pulse may result in the thermode tip reaching the predetermined temperature for a predetermined amount of time.

In some cases of the above methods, the temperature of the thermode tip may be raised above the working temperature during the energy pulse. In some cases, the thermode tip may be raised to a temperature that is at least greater than 120% of the working temperature, to at least greater than 200% of the working temperature, or to at least greater than 250% of the working temperature. The temperature and the amount of time that the energy pulse will be applied can be determined based on manufacturing parameters and the temperature range available given the material of the thermode tip.

In some cases of the above methods, the energy pulse is externally applied.

Other aspects and features will become apparent to those ordinarily skilled in the art upon review of the following description of specific embodiments in conjunction with the accompanying figures.

BRIEF DESCRIPTION OF DRAWINGS

Embodiments will now be described, by way of example only, with reference to the attached Figures, wherein:

FIG. 1A illustrates the front view construction of a typical thermode.

FIG. 1B illustrates the side view of the typical thermode in FIG. 1A.

FIG. 1C illustrates the perspective view of the typical thermode in FIG. 1A.

DETAILED DESCRIPTION

Figure 2:
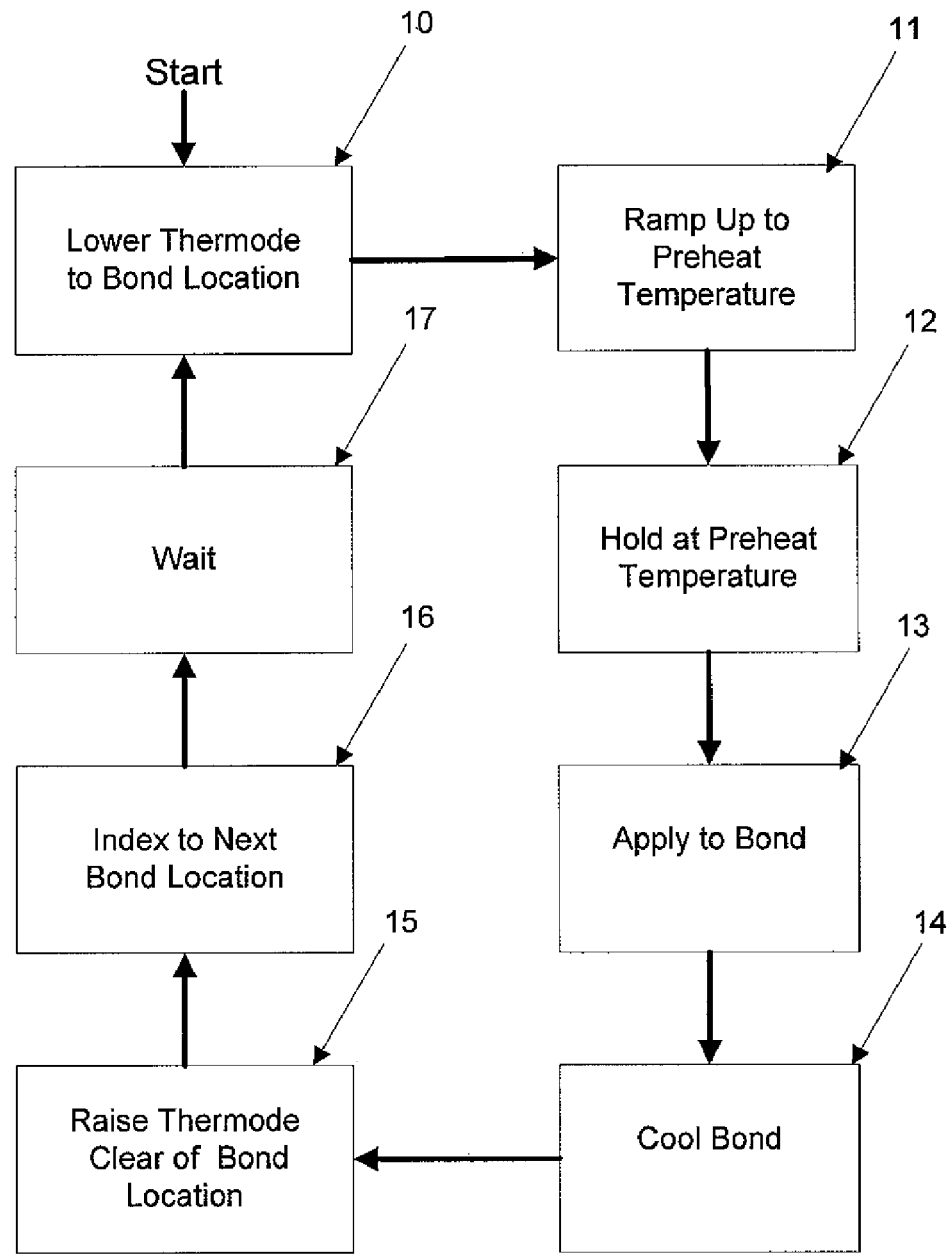
FIG. 2 illustrates a flow chart of a typical thermode reflow soldering process.

In one aspect herein, a method for cleaning a thermode tip comprising applying an energy pulse to the thermode tips is disclosed A typical thermode construction is illustrated in FIG. 1A, 1B and 1C. The thermode includes terminals (1) where the power is applied and a shank (2) for supporting and conducting current to a tip (3). A transition zone (4) allows for the joining of the tip (3) to the shank (2). The working surface (5) is the portion of the tip, which comes in contact with the part bond area. The tip (3) and, in particular, the working surface (5) generally require cleaning due to residue build-up, a byproduct of running soldering cycles.

FIG. 2 illustrates a typical thermode reflow soldering process. The thermode is first lowered to the bond area (10). The thermode is then ramped up to a preheat temperature (11) to the required temperature level for the bond. Once the preheat temperature is achieved the thermode holds at this temperature (12). The application of the thermode to the bond raises the bond above the liquidus temperature (13). The thermode is then cooled, which cools the bond below the solidus temperature (14). The cooling may be facilitated by an air blow off. The thermode tip is then moved off the bond area (15). There will generally be a move to the next bond location (16) or a part may be moved under the thermode location to expose a new bond location. This thermode soldering process is typically under 6 seconds per bond. In some cases there may be a wait (17) prior to moving to a new bond area or a new part being ready to be soldered and the process restarting.

Figure 3:
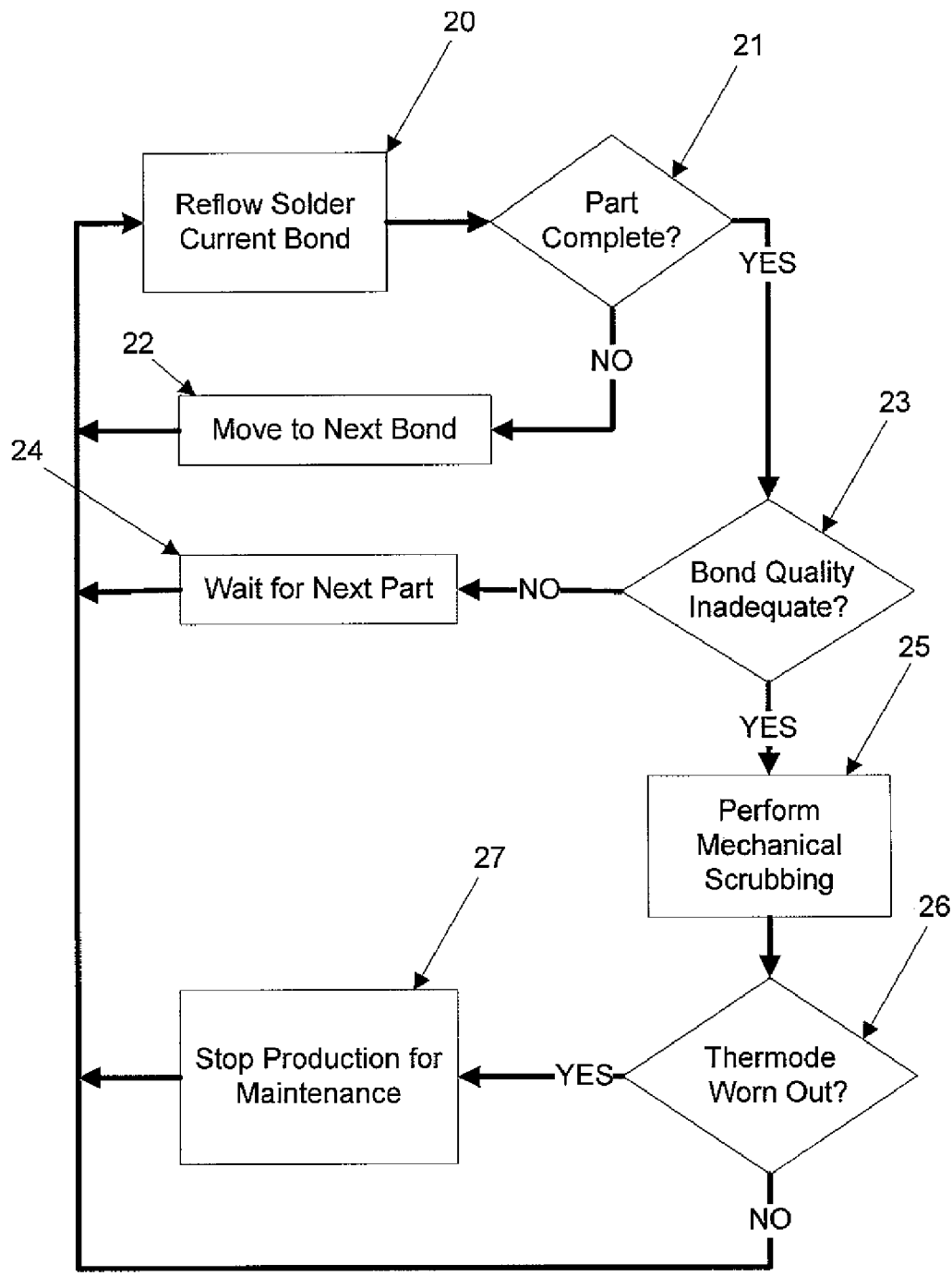
FIG. 3 illustrates a flow chart of a typical thermode cleaning cycle as practiced in the current state of the art.

FIG. 3 shows a flow chart of a typical cleaning cycle. First, the thermode solders a current bond area (20), for example, as shown in FIG. 2. Once the current bond area is soldered the process must determine if the part itself is complete (21). If there is at least one other bond area on the current part the process will generally move to the next bond (22), until all bonds on the part are complete.

If all the bonds on the part are completed the bond quality may be checked (23), for example by electrical testing or the like. If the bond quality is acceptable, the method will wait for the next part (24) then restart the cycle. If the bond quality is determined to be inadequate, a mechanical scrubbing (25) of the thermode tip may need to be performed. It will be understood that, in some cases, the bond quality may actually be checked while, in other cases or alternatively, a predetermined number of bonds may be set as the limit for when the mechanical scrubbing will be performed. The predetermined number may be determined in advance by conducting testing or studies of the bonds produced.

The mechanical scrubbing (25) may take upwards of 20 seconds to perform before the thermode may come back online and continue with the soldering process. After the mechanical scrubbing is performed, the quality of the thermode may be checked to determine if the thermode is worn out (26) or if it is able to continue with the next soldering cycle. The checking of the thermode may be a visual check, a test of heating capability, or other type of test as known in the art. If the thermode is worn out, production may be stopped for maintenance (27) during which the thermode is replaced. Stopping the production and completing the maintenance may take significant time, sometimes upwards of half an hour. During this time the soldering process is halted. Throughout a year, this downtime may add up to thousands of dollars of lost revenue.

Mechanical scrubbing (25) includes manually scrubbing the thermode with an abrasive material like a scrubbing pad or sandpaper. In this process, both the residue and a portion of the tip material are typically removed. This process may later compromise the mechanical structure of the thermode, reduce the thermal mass, and alter the electrical resistivity of the heat generating path. All of these may wear out the thermode and compromise the effectiveness of the soldering process and reduce the thermode life. Frequent mechanical scrubbing will increase the overall process time, taking minutes to move the scrubbing tool into position and perform each scrubbing cycle.

Other physical cleaning techniques may also be applied either in addition to or instead of completing mechanical scrubbing each time the bond quality is found to inadequate. For example, wet sponge method may be used. However, this method requires a sensor to determine the wetness of the sponge to be used to clean the thermode tip. Further, this cleaning method must be completed when the thermode tip is hot, which may become a fire hazard. As with mechanical scrubbing, the wet sponge cleaning may be required every cycle and may necessitate additional tooling including a motor for moving the sponge, a water container and pump to keep the sponge wet.

An air blast may also be used to clean the thermode tip although this method has the possibility of generating airborne particulate that could contaminate parts and the local environment. With use of either the wet sponge method or air blast method, mechanical scrubbing may still be required if the bond quality is found to be inadequate after the wet sponge or air blast cleaning have been completed.

Figure 4:
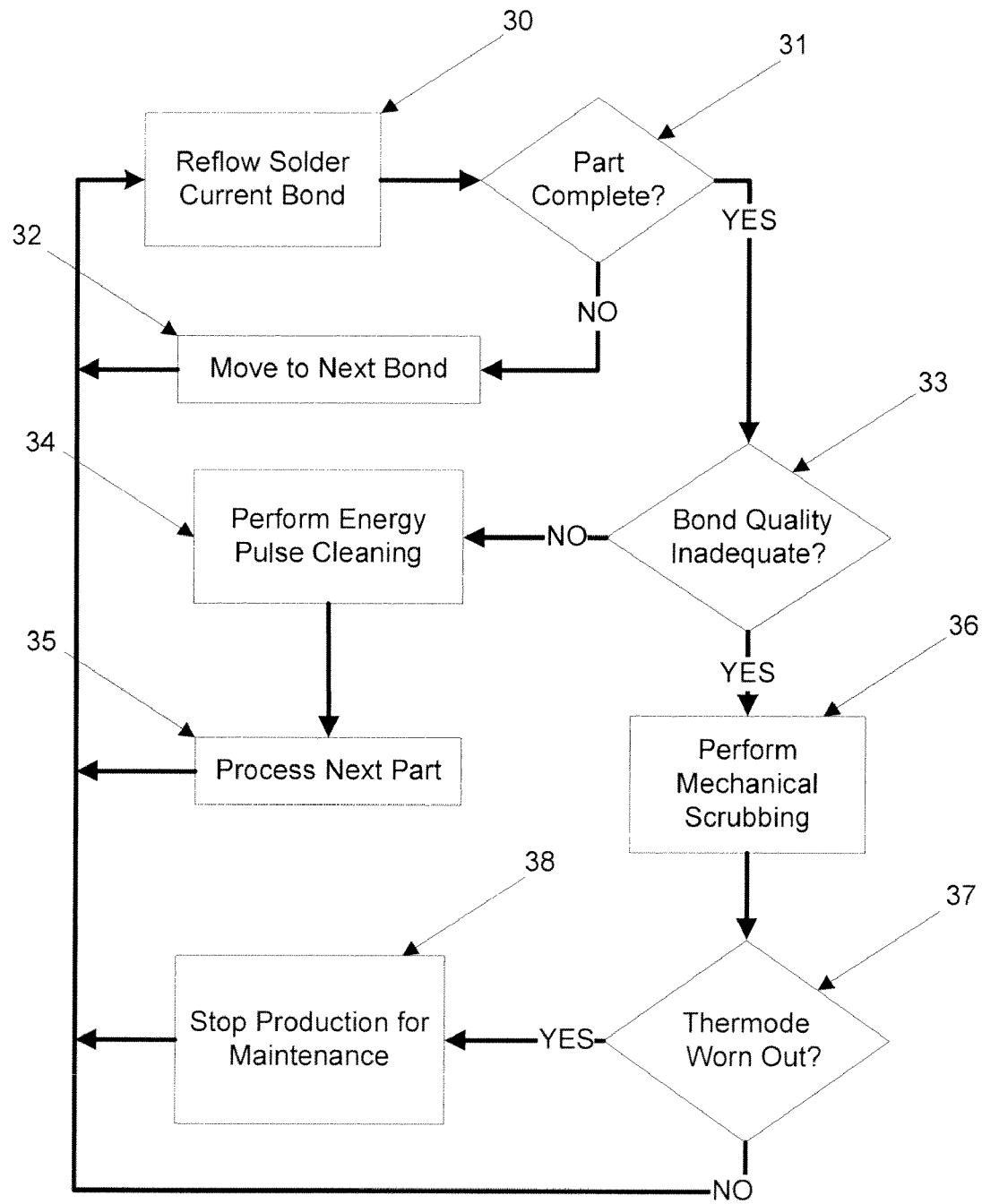
FIG. 4 illustrates a flow chart of a thermode cleaning method according to one embodiment of the present application.

In order to overcome at least some of the drawbacks of conventional methods, the present application provides a method of applying an energy pulse to the thermode tip either after each soldering operation, after each part, after a predetermined number of soldering operations, or the like. As shown in FIG. 4, the soldering process of the present method commences similarly to a conventional method, in that a current bond is soldered (30), the process determines if the part is complete (31) and if there is at least one other bond area on the current part, the process will move to the next bond (32).

Once a part is complete, the bond quality may be reviewed (33) and, if the bond quality is adequate, the method will perform an energy pulse cleaning (34). This energy pulse cleaning (34) may preferably be performed during idle time when the thermode is otherwise not being used, for example, waiting for a new part to enter the process.

The energy pulse consists of an elevation of the thermode tip temperature to a predetermined temperature higher than the working temperature of the thermode for a predetermined period of time. In this way, the energy pulse may be considered to be a function of time and temperature and the amount of energy to be input, whether through high temperature for a short time or a lower temperature for a longer time. The temperature and time can be determined based on various factors or through testing as will be understood in the art. In a manufacturing environment, the time available is typically controlled by process parameters such as part movement, number of actions performed, and the like. As such, the temperature needed is generally at least partly predetermined by the amount of time available. It will, of course, be understood that, in some cases, it may be necessary to raise the temperature of the thermode tip for a time longer than the cycle time available, however this is generally not preferred with regard to manufacturing efficiency.

In a conventional soldering process, the thermode tip temperature is typically lowered below the working temperature when the thermode is idle (see FIG. 7A, described in further detail below). This may be, for example, because energy can be conserved by allowing the thermode tip to cool when idle. In contrast to this conventional approach, the method herein raises the temperature of the thermode tip above the working temperature using the energy pulse. Generally, it is preferred if the increase of the temperature is to a temperature that is at least greater than 120% of the working temperature. In some cases, the temperature may be greater than 150% of the working temperature. In other cases, the temperature may be greater than 200% of the working temperature. In still other cases, the temperature may be greater than 250% of the working temperature. In all cases, the increase in temperature should be kept below any temperature that may damage the thermode tip. As noted above, the time available for the energy pulse is often determined based on other factors but may be in a range greater than 0.1 sec in accordance with the temperature to be used. It will be understood that the word "pulse" as used herein is not intended to limit the amount of time that the energy may be applied but is used for convenience because the time is ideally shorter than longer in terms of manufacturing efficiency.

The energy pulse is generally performed when the thermode tip is out of contact with the bond area so that additional heating of the bond area does not occur. The temperature may be raised by normal operation of the thermode and using closed loop temperature control. Alternatively, the temperature may be elevated by exposing the tip to an external source of energy or heat; although this approach may require additional tooling.

In one particular example the flux used is a tin based flux that may have a liquidus temperature of 240°. Normal reflow temperatures for soldering with this material may have a working temperature of 320°. In this example, the energy pulse is configured to raise the temperature of the thermode tip to approximately twice the working temperature for a period of approximately 10 seconds, which, in this process, was the amount of time needed to ready the system to solder the next part.

During energy pulse cleaning (34), it is believed that any solder remaining on the thermode tip is raised to a temperature sufficient for the surface tension of the solder to form spherical beads on the working surface and at least a portion of the residue is burned off the tip and vaporized. It may be that with, for example, the use of a titanium thermode, the residue does not bond well to the titanium oxide that is typically present on the thermode tip and the energy pulse allows the titanium oxide to reform and protect the thermode tip. Other chemical reactions may also be occurring that protect the thermode tip from residue.

Small amounts of combustion by-products may be created during the energy pulse process. In some cases, the remaining solder and combustion by-products may stay on the thermode tip and, during the following soldering cycles, it is believed that the debris is transferred back from the thermode tip to the surface of the solder joint as the solder is melted. The debris appears to remain on the surface and it is believed that the debris is not transferred into the bond.

Once the energy pulse cleaning is completed the system is ready to process the next part (35) and begin this cycle again. If at the end of the next or subsequent cycles the thermode tip cleanliness is inadequate (33), mechanical scrubbing may be performed (36). After the mechanical scrubbing the quality of the thermode tip may be reviewed (37) and if the thermode needs to be replaced the production may be stopped for maintenance (38).

The cleanliness of the thermode tip may be estimated or determined in a variety of ways, which will assist with determining the number of solder operations (cycles) between energy pulses and mechanical cleanings. For example, the energy transfer to the bond from the thermode tip may be monitored, either during test runs or in production, to determine an appropriate number of soldering cycles before cleaning.

Tests have shown that the energy pulse cleaning method significantly reduces the need for mechanical scrubbing cycles. In one example, it was found that mechanical scrubbing was required 4 times more often on thermodes not exposed to the energy pulse. Also, thermodes that were exposed to the energy pulse cleaning were capable of almost 3 times as many bonds before wearing out and needing to be replaced.

Figure 5:
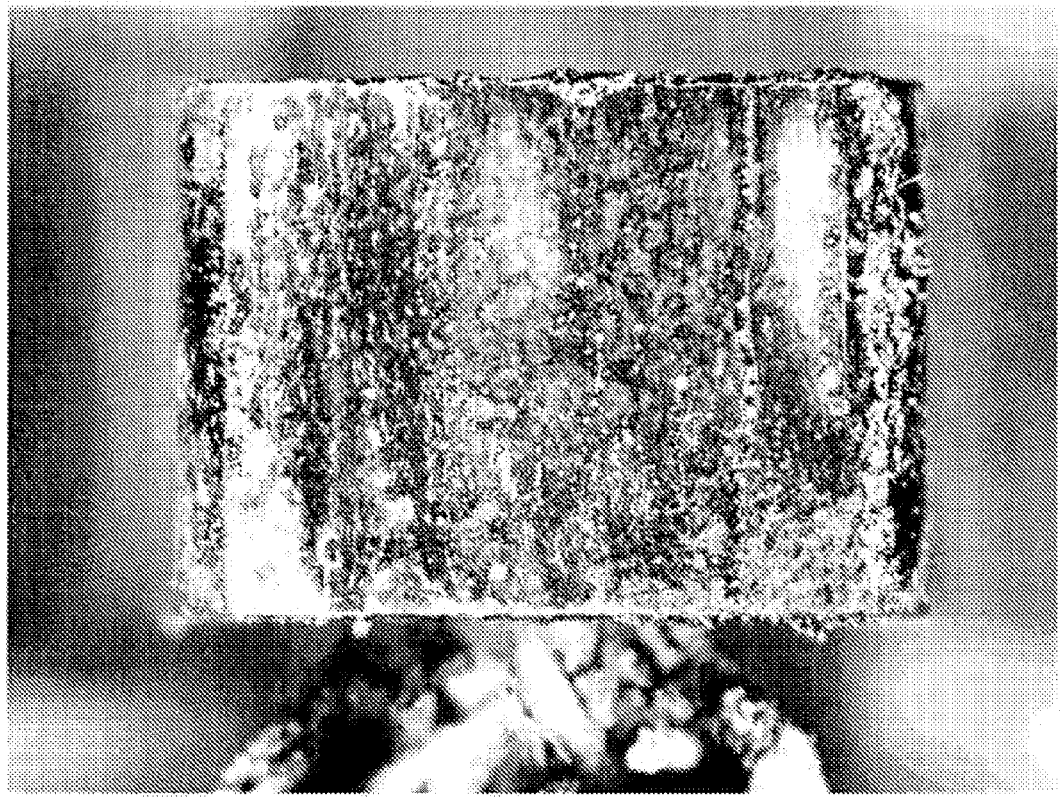
FIG. 5 illustrates a thermode working surface after 175 bonds since the last performed mechanical scrubbing, using the typical cleaning cycle as practiced in the current state of the art.
Figure 6:
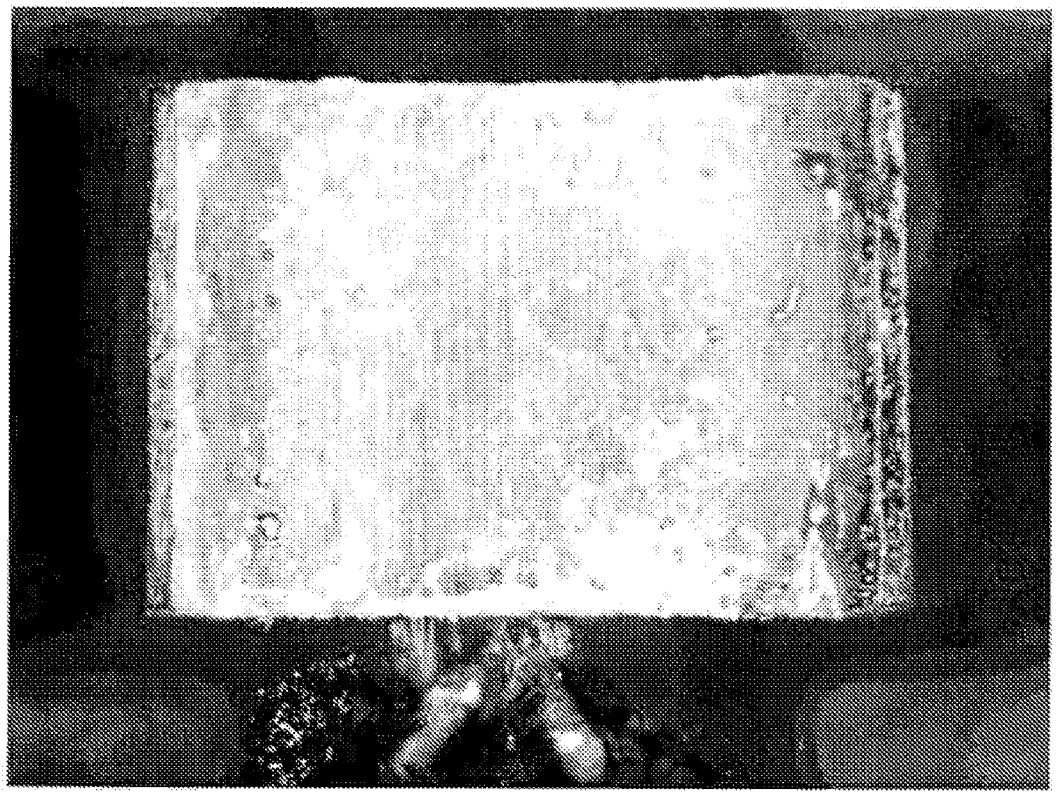
FIG. 6 illustrates a thermode working surface contamination after 375 bonds since the last performed mechanical scrubbing using the cleaning method provided for in the present application.

The increased cleanliness of the thermode using the method herein is further illustrated in FIGS. 5 and 6. FIG. 5 illustrates a thermode working surface after 175 bonds since the last performed mechanical scrubbing using the typical state of the art while FIG. 6 illustrates the working surface contamination after 375 bonds since the last performed mechanical scrubbing using the energy pulse cleaning method. Even with over twice as many bonds, the thermode making use of the energy pulse cleaning method contains less residue than the working surface of the thermode in a typical process.

Figure 7A:
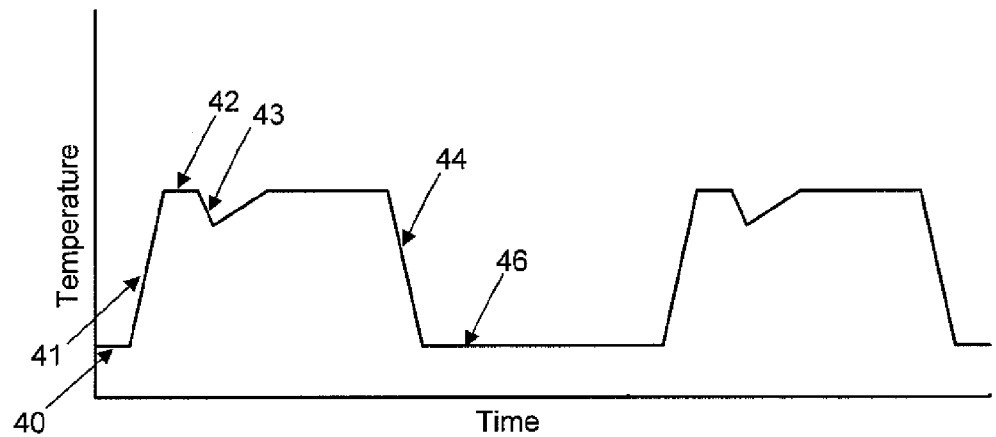
FIG. 7A illustrates reflow soldering temperature profile without using the present method.
Figure 7B:
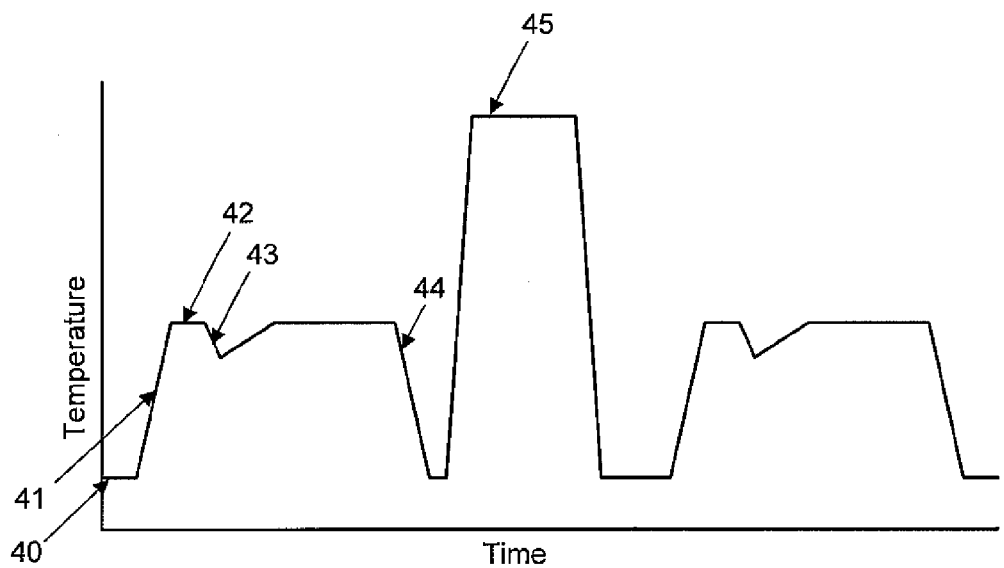
FIG. 7B illustrates reflow soldering temperature profile according to one embodiment of the energy pulse cleaning system.

FIGS. 7A and 7B illustrate the soldering temperature profiles with and without using the energy pulse cleaning method. In FIG. 7A, the process begins with an idle temperature (40) followed by a ramp up (41) then a short holding of the temperature (42) prior to the soldering commencing (43). Once the soldering is completed the traditional process cools down (44) then waits at an idle temperature (46) prior to repeating the above process. In FIG. 7B, the temperature profile for the present energy pulse cleaning method commences in a similar manner in that the thermode starts at an idle temperature (40), heats up (41) then holds at that temperature (42) prior to starting the soldering process (43). The present method then provides for an energy pulse (45) after the thermode has completed the bonding process (44). It is this energy pulse that aids in the cleaning of the thermode and reduces the residue thus reducing the frequency for mechanical cleaning. As noted above, the energy pulse is not necessarily applied after each soldering operation. Further, the thermode tip may not necessarily need to be cooled prior to applying the energy pulse.

This energy pulse cleaning method allows for the energy pulse cleaning to be accomplished without additional external tooling. As the carbon debris and excess solder may remain on the thermode tip and be removed in a later soldering cycle, no debris is expelled into the air, no wet sponge cleaning or the like is required and no additional mechanical wear and tear is experienced by the thermode tip during the energy pulse. The mechanical scrubbing of the thermode tip is required at a reduced frequency in the present method, which may extend service life of the thermodes tips.

The energy pulse method is intended to create a continuous self-cleaning mechanism, which may keep the thermode tip generally clean and free of debris. It has been observed that applying this method to titanium thermodes, the titanium thermodes stayed reasonably clean even after over 700 soldering cycles. No further scrubbing was required to dress the thermode tip for further soldering process during these cycles.

This method is preferably used in conjunction with titanium thermodes tips; although, thermode tips made of molybdenum, Inconel®, tungsten and other metals having similar properties may also benefit from this process. Presently preferred thermode metals include: low resistance grades of titanium such as commercially pure Ti in ASTM grades 1, 2, 3 or 4; alloys of Ti with moderate resistivity such as ASTM grades 12, 15, 17 or 9; other alloys of titanium particularly for thermodes with relatively small tips. The use of this method with non-titanium thermodes has not been tested in detail.

In the preceding description, for purposes of explanation, numerous details are set forth in order to provide a thorough understanding of the embodiments. However, it will be apparent to one skilled in the art that these specific details may not be required in order to practice the embodiments. In other instances, well-known electrical structures and circuits may be shown in block diagram form in order not to obscure the embodiments.

The above-described embodiments are intended to be examples only. Alterations, modifications and variations can be effected to the particular embodiments by those of skill in the art without departing from the scope, which is defined solely by the claims appended hereto.

We claim:

1. A method for cleaning a thermode tip comprising:
    applying an energy pulse to the thermode tip while the thermode tip is not in contact with a bond, such that the thermode tip reaches a predetermined temperature above a working temperature of the tip.
2. The method of claim 1 wherein the thermode tip is held at the predetermined temperature for a predetermined amount of time.
3. The method of claim 1 wherein the energy pulse is externally applied.
4. The method of claim 1 wherein the predetermined temperature is at least greater than 120% of the working temperature.
5. The method of claim 1 wherein the predetermined temperature is at least greater than 200% of the working temperature.
6. The method of claim 1 wherein the predetermined temperature is at least greater than 250% of the working temperature.
7. The method of claim 2 wherein the predetermined amount of time the energy pulse is applied is determined by manufacturing parameters and a temperature range available given the material of the thermode tip.
8. The method of claim 1 wherein the predetermined temperature of the energy pulse is determined by manufacturing parameters and a temperature range available given the material of the thermode tip.
9. A method for cleaning a thermode tip comprising periodically:
    performing a predetermined number of soldering cycles at a working temperature: and
    applying an energy pulse to the thermode tip while the thermode tip is not in contact with a bond, such that the thermode tip reaches a predetermined temperature above the working temperature of the thermode top.
10. The method of claim 9 wherein the thermode tip is held at the predetermined temperature for a predetermined amount of time.
11. The method of claim 9 wherein the predetermined temperature is at least greater than 120% of the working temperature.
12. The method of claim 9 wherein the predetermined temperature is at least greater than 200% of the working temperature.
13. The method of claim 10 wherein the predetermined amount of time the energy pulse is applied is determined by manufacturing parameters and a temperature range available given the material of the thermode tip.
14. The method of claim 9 wherein the energy pulse is externally applied.
15. The method of claim 9 wherein the predetermined temperature of the energy pulse is determined by manufacturing parameters and a temperature range available given the material of the thermode tip.

* * * * *